(12) United States Patent
Morimoto

(10) Patent No.: US 8,314,831 B2
(45) Date of Patent: Nov. 20, 2012

(54) IMAGING SYSTEM, CAMERA CONTROL APPARATUS, PANORAMA IMAGE GENERATION METHOD AND PROGRAM THEREFOR

(75) Inventor: Shinichi Morimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1522 days.

(21) Appl. No.: 11/497,341

(22) Filed: Aug. 2, 2006

(65) Prior Publication Data

US 2007/0030341 A1 Feb. 8, 2007

(30) Foreign Application Priority Data

Aug. 3, 2005 (JP) ................................ 2005-225831

(51) Int. Cl.
*H04N 7/00* (2011.01)
(52) U.S. Cl. ....................................................... 348/36
(58) Field of Classification Search .............. 348/36–39, 348/207, 211, 33.02
See application file for complete search history.

(56) References Cited

U.S. PATENT DOCUMENTS

| | | | | |
|---|---|---|---|---|
| 6,115,058 A | * | 9/2000 | Omori et al. ..................... | 348/45 |
| 6,304,284 B1 | * | 10/2001 | Dunton et al. .................. | 348/36 |
| 6,380,972 B1 | * | 4/2002 | Suga et al. ............... | 348/211.99 |
| 6,392,658 B1 | * | 5/2002 | Oura ............................. | 345/629 |
| 6,930,703 B1 | * | 8/2005 | Hubel et al. .................... | 348/37 |
| 2001/0019355 A1 | | 9/2001 | Koyanagi et al. | |
| 2005/0222801 A1 | * | 10/2005 | Wulff et al. .................... | 702/141 |
| 2005/0253806 A1 | * | 11/2005 | Liberty et al. ................ | 345/156 |

FOREIGN PATENT DOCUMENTS

| | | |
|---|---|---|
| EP | 1 834 312 A2 | 9/2007 |
| JP | 11-8844 | 1/1999 |
| JP | 2000-341574 | 12/2000 |
| JP | 2001-136431 | 5/2001 |
| WO | WO 2006/074161 A2 | 7/2006 |

OTHER PUBLICATIONS

Extended European Search Report issued Apr. 7, 2011, in Application No. / Patent No. 06015932.4-1228 / 1750431.

* cited by examiner

Primary Examiner — Mehrdad Dastouri
Assistant Examiner — James Anderson, II
(74) Attorney, Agent, or Firm — Oblon, Spivak, McClelland, Maier & Neustadt, L.L.P.

(57) ABSTRACT

Disclosed is an imaging system including a camera terminal apparatus capable of performing pan operation and/or tilt operation and a camera control apparatus for controlling the camera terminal apparatus. In the imaging system, the camera terminal apparatus includes a signal processor configured to generate a panorama image, a panorama image storing unit configured to store the generated panorama image, and an imaging direction controller configured to generate camera position information indicative of an imaging direction, and the camera control apparatus includes a position determination processor configured to determine a position of the imaging direction in the panorama image, based on the camera position information, and a panorama image processor configured to process the panorama image in such a way that the determined position becomes the center position of an image.

8 Claims, 7 Drawing Sheets

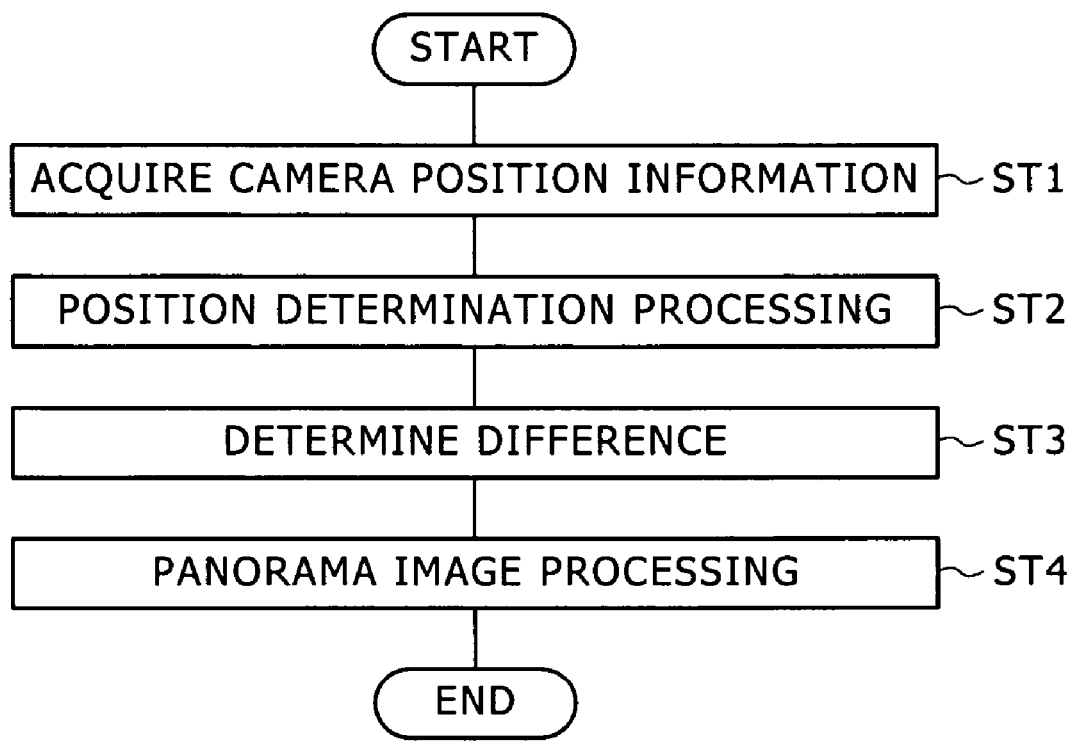

IMAGING SYSTEM, CAMERA CONTROL APPARATUS, PANORAMA IMAGE GENERATION METHOD AND PROGRAM THEREFOR

CROSS REFERENCES TO RELATED APPLICATIONS

The present invention contains subject matter related to Japanese Patent Application JP 2005-225831 filed in the Japanese Patent Office on Aug. 3, 2005, the entire contents of which being incorporated herein by reference.

BACKGROUND OF THE INVENTION

1. Field of the Invention

The present invention relates to an imaging system, a camera control apparatus, a panorama image generation method and a program therefor. More specifically, the position of an imaging direction of a camera in a panorama image is determined based on camera position information indicative of the imaging direction of the camera, and the panorama image is processed in such a way that the determined position becomes the center position of the image, thereby displaying the panorama image with the imaging direction being the center.

2. Description of the Related Art

In the past, as described in patent document 1, the image of an entire area shot by performing pan/tilt operation with a pan/tilt-capable imaging apparatus is displayed as a panorama image.

If the panorama image is formed in such a way that the center position of the image coincides with, for example, the center direction of a pan operating range and a cursor that indicates and synchronizes with an imaging direction is displayed on the panorama image, it is possible to easily determine the imaging direction. Further, for example, at the time of displaying an image of a desired position, it is possible to easily determine how to move the imaging direction, based on the panorama image and the position of the displayed cursor.

For example, assuming that an imaging apparatus 80 has an angle of view of 90 degrees as shown in FIG. 7A, a rightward pan operating range extends up to a position Prm located at "−120°" from a center position Pc as shown in FIG. 7B, and a leftward pan operating range extends up to a position Plm located at "+120°" from the center position Pc as shown in FIG. 7C, the panorama image is an image GPr showing the range of +165° to −165° as shown in FIG. 7D.

If a cursor QT indicative of the imaging direction of the imaging apparatus is displayed on such a panorama image, for example at the time of acquiring an image of a desired position, it is possible to easily determine the pan operating direction of the imaging apparatus, based on the relationship between the desired position in the panorama image and the displayed cursor position.

[Patent document 1] Japanese Patent Application Laid-Open No. 2001-136431

SUMMARY OF THE INVENTION

For example, an imaging apparatus that can perform pan operation in an endless manner is in practical use. However, at the time of displaying and using a cursor indicative of an imaging direction on a panorama image displayed using such an imaging apparatus, there may arise an inability to rapidly move the imaging direction to a desired direction.

For example, assume that an imaging direction is moved from a position PSa to a position PSb in a panorama image GPe shown in FIG. 8. If it is possible to perform pan operation in an endless manner, moving the imaging direction to the right rather than to the left reduces the amount of movement, thereby making it possible to rapidly move the imaging direction from the position PSa to the position PSb. However, in the case of using a cursor QT displayed on the panorama image, the position PSb is located on the left side of the position PSa of the cursor QT. Accordingly, pan operation is so performed that the imaging direction of the cursor QT moves to the position of a cursor QT' indicated by broken lines, thus causing an inability to rapidly move the imaging direction to the desired direction.

According to an embodiment of the present invention, there is provided an imaging system, a camera control apparatus, a panorama image generation method and a program therefor that can rapidly move an imaging direction to a desired direction.

An imaging system according to an embodiment of the invention includes a camera terminal apparatus capable of performing pan operation and/or tilt operation and a camera control apparatus for controlling the camera terminal apparatus. In the imaging system, the camera terminal apparatus includes a signal processor configured to generate a panorama image, a panorama image storing unit configured to store the generated panorama image, and an imaging direction controller configured to generate camera position information indicative of an imaging direction, and the camera control apparatus includes a position determination processor configured to determine a position of the imaging direction in the panorama image, based on the camera position information, and a panorama image processor configured to process the panorama image in such a way that the determined position becomes the center position of an image.

An camera control apparatus according to an embodiment of the invention includes a position determination processor configured to determine a position of the imaging direction in a panorama image, based on camera position information indicative of an imaging direction of a camera, and a panorama image processor configured to process the panorama image in such a way that the determined position becomes the center position of an image. The panorama image processor determines a difference between the determined position and the center position of the panorama image, and in the case where the determined position is turned to the center position of a panorama image display frame, the panorama image processor pastes an image for the difference outside the panorama image display frame to an area having no image in the panorama image display frame, thus processing the panorama image in such a way that the determined position becomes the center position of an image. The camera control apparatus further includes a display configured to display the panorama image processed by the panorama image processor, a display processor configured to display a cursor indicative of the imaging direction of the camera on the panorama image, a user interface, and a controller configured to provide an instruction for performing pan operation and/or tilt operation in accordance with movement of the cursor when an operation to move the cursor is performed through the user interface.

A panorama image display method and a program according to an embodiment of the invention include the steps of acquiring camera position information indicative of an imaging direction of a camera; determining a position of the imaging direction in a panorama image, based on the camera position information; determining a difference between the determined position and the center position of the panorama image; and processing the panorama image in such a way that the determined position becomes the center position of an image, based on the difference.

According to an embodiment of the invention, based on camera position information indicative of the imaging direction of a camera, the position of the imaging direction in a panorama image is determined, and the panorama image is processed in such a way that the determined position becomes the center position of the image. Since the processed panorama image presents the imaging direction as the center position of the image, if it is possible to perform pan operation etc. in an endless manner, the use of the processed panorama image makes it possible to rapidly move the imaging direction to a desired direction and easily determine the current imaging direction.

BRIEF DESCRIPTION OF THE DRAWINGS

Embodiments of the present invention will be described in detail based on the following figures, wherein:

FIG. 6 is a flowchart showing panorama image display processing;

DESCRIPTION OF THE PREFERRED EMBODIMENTS

Figure 1:
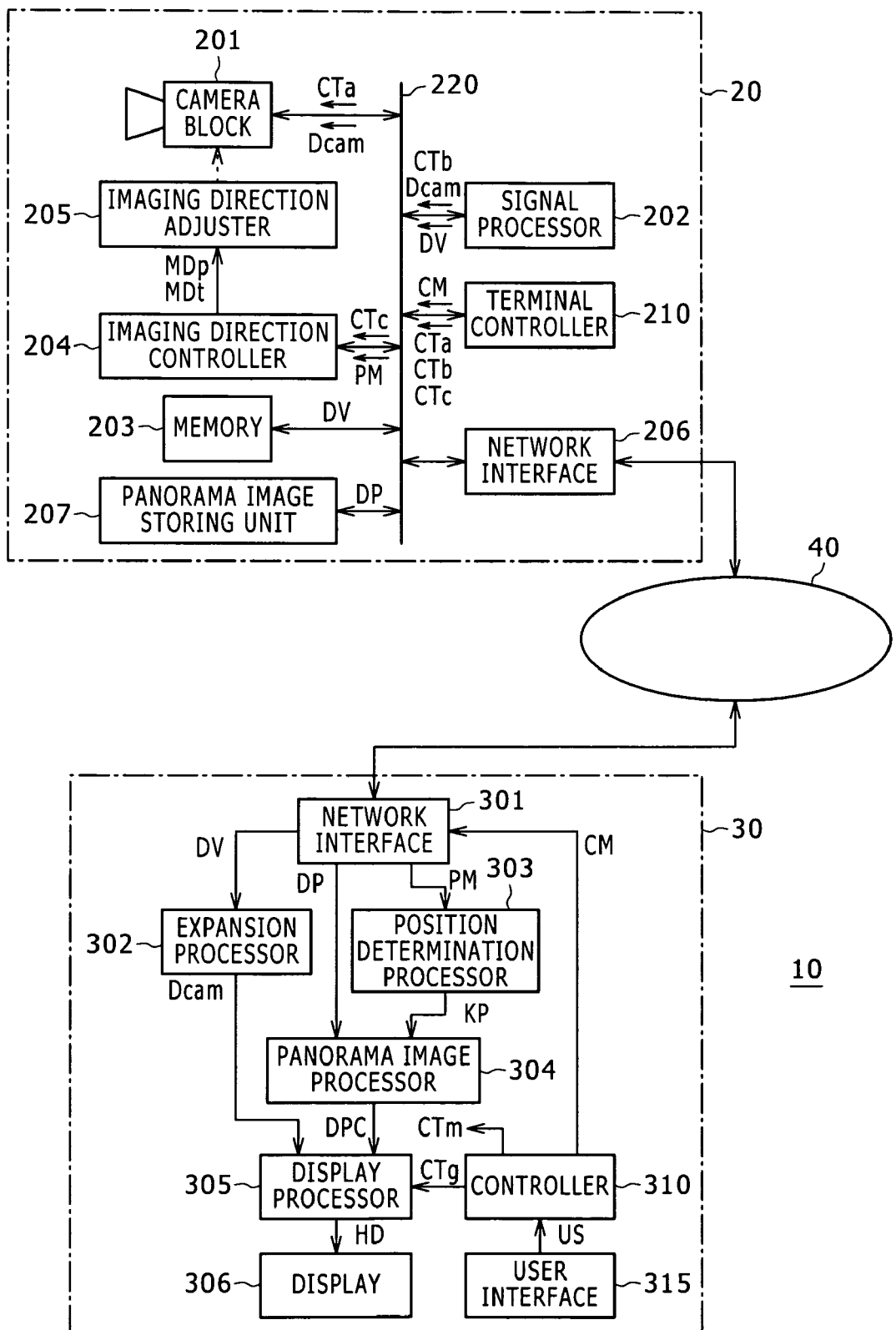
FIG. 1 is a block diagram of an imaging system.

An embodiment of the present invention will be described below in detail with reference to the accompanying drawings. FIG. 1 is a block diagram of an imaging system. An imaging system 10 includes a camera terminal apparatus 20 and a camera control apparatus 30. The camera terminal apparatus 20 and the camera control apparatus 30 are connected to each other via a network 40.

In accordance with an imaging control signal CTa supplied from a terminal controller 210 described later, a camera unit 201 of the camera terminal apparatus 20 performs imaging operation and generates a video signal Dcam. Further, the camera unit 201 supplies the generated video signal Dcam to a signal processor 202 via a bus 220. The bus 220 is also connected to a memory 203, an imaging direction controller 204, a network interface 206, a panorama image storing unit 207, and a terminal controller 210.

The signal processor 202 performs compression processing on the video signal Dcam and stores an obtained video encoded signal DV into the memory 203. Further, the signal processor 202 generates a video signal of a panorama image (hereinafter referred to as a "panorama image signal") DP using video signals Dcam obtained by sequentially shifting the imaging direction of the camera unit 201 and stores the panorama image signal DP into the panorama image storing unit 207. The compression processing of the video signal Dcam and the generation of the panorama image signal DP are performed in accordance with a signal processing control signal CTb supplied from the terminal controller 210 described later.

The imaging direction controller 204 calculates a speed and an acceleration for use in moving the imaging direction of the camera unit 201 to the direction instructed by a direction control signal CTc supplied from the terminal controller 210 described later. Based on the calculation result, the imaging direction controller 204 further generates a drive signal MDp for pan operation and a drive signal MDt for tilt operation, and supplies them to an imaging direction adjuster 205. Furthermore, the imaging direction controller 204 generates a camera position information signal PM indicative of the imaging direction of the camera unit 201 and supplies it to the terminal controller 210.

The imaging direction adjuster 205 includes a pan operation motor for moving the camera unit 201 left or right and a tilt operation motor for moving the camera unit 201 up or down. The imaging direction adjuster 205 drives the pan operation motor in accordance with the drive signal MDp and the tilt operation motor in accordance with the drive signal MDt to adjust the imaging direction of the camera unit 201 to the direction instructed by the direction control signal CTc. Further, the imaging direction adjuster 205 performs pan operation in an endless manner without operating range limitations.

The network interface 206 is an interface for use in communication between the camera terminal apparatus 20 and the camera control apparatus 30 via the network 40.

The terminal controller 210 controls the camera unit 201 in accordance with the imaging control signal CTa, the signal processor 202 in accordance with the signal processing control signal CTb, and the imaging direction controller 204 in accordance with the direction control signal CTc so as to allow the camera unit 201 to perform imaging operation while sequentially shifting the imaging direction and allow the signal processor 202 to generate a panorama image signal DP based on the obtained video signals Dcam and store the panorama image signal DP into the panorama image storing unit 207.

Figure 2:
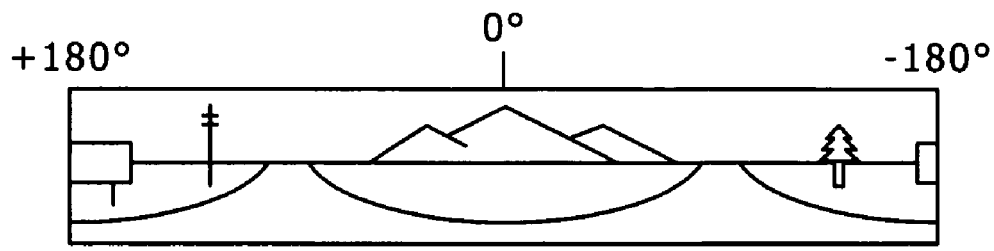
FIG. 2 is an illustration of assistance in explaining a panorama image in the case of endless pan.

As described above, the imaging direction adjuster 205 is so constructed as to perform pan operation in an endless manner. Accordingly, in order to avoid overlapping of images, the panorama image stored in the panorama image storing unit 207 provides a +180° angle difference from a reference direction at one end and a −180° angle difference from the reference direction at the other end, as shown in FIG. 2, for example. Further, since the pan operating range is not limited, it is not possible to determine the center position of the operating range as a reference direction as in the case where the operating range is limited. For this reason, a reference direction is preset, and a panorama image signal DP is generated in such a way that the preset reference direction is the center position of a panorama image. The imaging direction controller 204 generates a signal indicative of e.g., the angle difference of an imaging direction with respect to the preset reference direction, as a camera position information signal PM.

If a reference direction is thus preset, it is not necessary to determine which direction is used as a reference to generate a panorama image. Assuming that the camera position information signal PM indicates the angle difference of an imaging direction with respect to the reference direction, it is possible to easily determine the position of the imaging direction based on the camera position information signal PM in the panorama image.

The terminal controller 210 analyzes a command signal CM supplied from the camera control apparatus 30 via the network interface 206 to generate an imaging control signal CTa, a signal processing control signal CTb, and a direction control signal CTc. Further, the terminal controller 210 performs processing for sending out the video encoded signal DV stored in the memory 203, the panorama image signal DP stored in the panorama image storing unit 207, and the camera position information signal PM supplied from the imaging direction controller 204 to the camera control apparatus 30.

A network interface 301 of the camera control apparatus 30 is an interface for use in communication between the camera terminal apparatus 20 and the camera control apparatus 30 via the network 40. The network interface 301 supplies the video encoded signal DV supplied from the camera terminal apparatus 20 to an expansion processor 302. Further, the network interface 301 supplies the camera position information signal PM to a position determination processor 303 and the panorama image signal DP to a panorama image processor 304.

The expansion processor 302 performs expansion processing on the video encoded signal DV and supplies the obtained video signal Dcam to a display processor 305.

The position determination processor 303 determines which position in the panorama image corresponds to the imaging direction indicated by the camera position information signal PM and supplies a position determination result KP to the panorama image processor 304. Assuming that, as described above, the panorama image signal DP is generated in such a way that the preset reference direction is the center position of a panorama image and the camera position information signal PM indicates the angle difference between the reference direction and the current imaging direction, it is possible to easily determine which position in the panorama image corresponds to the current imaging direction, based on the camera position information signal PM.

The panorama image processor 304 performs panorama image processing based on the position determination result KP and generates a panorama image signal DPC of the panorama image in which the determined position is set as the center position. The panorama image processor 304 determines the difference between the determined position and the center position of the panorama image, and processes the panorama image in such a way that the determined position becomes the center position of the image, based on the determined difference. That is, the panorama image processor 304 sets a panorama image display frame of "±180°" in which the determined position becomes the center position, pastes a panorama image of the area for the difference outside the panorama image display frame to the area having no image, and thereby generates the panorama image signal DPC of the panorama image in which the determined position becomes the center position. Further, the panorama image processor 304 supplies the panorama image signal DPC generated by performing panorama image processing to the display processor 305.

The display processor 305 generates a display drive signal HD using a GUI video signal generated based on the video signal Dcam supplied from the expansion processor 302, the panorama image signal DPC supplied from the panorama image processor 304, and a GUI display control signal CTg supplied from a controller 310 described later, and supplies the display drive signal HD to a display 306.

The display 306 displays the panorama image in which the imaging direction is the center position, an image shot by the camera unit 201, GUI images, and the like on the screen by driving a display device such as a liquid crystal device, a plasma display panel, or a cathode ray tube in accordance with the display drive signal HD.

A GUI-based user interface 315 presents information to a user through the display 306. When, based on the presented information, a user operation is performed using an input device such as a pointing device, a keyboard or the like, the user interface 315 supplies an operation signal US according to the user operation to the controller 310 which performs a desired operation.

Based on the operation signal US and the display state of the display 306, the controller 310 determines which processing the user has selected and which processing the user has requested the imaging system to execute. Based on the determination result, the controller 310 generates a command signal CTm and supplies it to each unit to control the operation of the camera control apparatus 30. Further, based on the determination result, the controller 310 generates a command signal CM and supplies it to the camera terminal apparatus 20 via the network interface 301 to control the operation of the camera terminal apparatus 20. Furthermore, the controller 310 generates a GUI display control signal CTg and supplies it to the display processor 305.

Next, panorama image display operation will be described. At the start of the operation, the controller 310 sends to the camera terminal apparatus 20 the command signal CM for requesting the panorama image signal DP, the camera position information signal PM, and the video encoded signal DV. If there is a panorama image signal DP stored in the panorama image storing unit 207, the camera terminal apparatus 20 reads the panorama image signal DP and sends it to the camera control apparatus 30. If there is no panorama image signal DP stored in the panorama image storing unit 207, the camera terminal apparatus 20 controls the camera unit 201, the signal processor 202, and the imaging direction controller 204 so as to perform imaging operation while shifting the imaging direction. Thus, the camera terminal apparatus 20 generates a panorama image signal DP and sends it to the camera control apparatus 30. Further, the camera terminal apparatus 20 stores the generated panorama image signal DP in the panorama image storing unit 207.

The camera terminal apparatus 20 supplies the camera position information signal PM generated by the imaging direction controller 204 to the camera control apparatus 30. Further, the camera terminal apparatus 20 starts the imaging operation of the camera unit 201, and the signal processor 202 compresses the obtained video signal Dcam and stores the video encoded signal DV in the memory 203. Furthermore, the camera terminal apparatus 20 supplies the video encoded signal DV stored in the memory 203 to the camera control apparatus 30.

The position determination processor 303 of the camera control apparatus 30 determines which position in the panorama image corresponds to the imaging direction indicated by the camera position information signal PM and supplies a position determination result KP to the panorama image processor 304. In the case where the angle difference indicated by the camera position information signal PM is "0°" for example, the imaging direction is the center position of the panorama image because the imaging direction is set to the reference direction.

The panorama image processor 304 performs panorama image processing based on the position determination result KP. If the position determination result KP indicates that the position of the imaging direction is the center position of the panorama image, since the image of the imaging direction is the center of the panorama image, the panorama image processor 304 does not perform panorama image processing and supplies the panorama image signal DP as the panorama image signal DPC to the display processor 305.

The expansion processor 302 expands the video encoded signal DV and supplies the obtained video signal Dcam to the display processor 305. The controller 310 supplies the GUI display control signal CTg used for GUI display to the display processor 305.

Accordingly, an image shot by the camera unit 201, a panorama image in which the reference direction is the center position, and GUI images are displayed on the screen of the display 306 driven by the display drive signal HD from the display processor 305.

Figure 3:
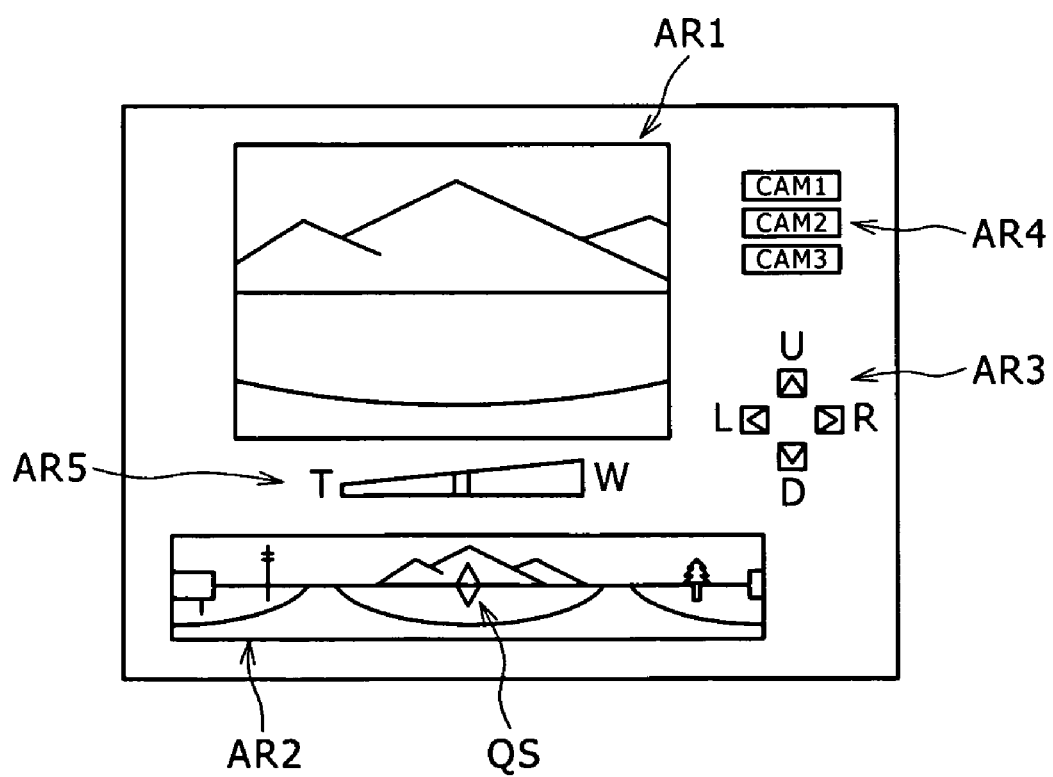
FIG. 3 is an illustration showing a display screen.

FIG. 3 exemplifies a display on the screen of the display 306. An image shot by the camera unit 201 is displayed in a display area AR1, and a panorama image is displayed in a display area AR2. Further, a GUI image for adjusting an imaging direction is displayed in a display area AR3, a GUI image for selecting a camera terminal apparatus for a desired image display when a plurality of camera terminal apparatuses 20 are connected to the camera control apparatus 30 via the network 40 is displayed in a display area AR4, and a GUI image for zooming in or out the shot image displayed in the display area AR1 is displayed in a display area AR5. Furthermore, a GUI image (hereinafter referred to as an "imaging direction cursor") QS indicative of an imaging direction in the panorama image in the display area AR2 is displayed.

Upon performing an operation to move the imaging direction cursor QS to a desired position on the panorama image, for example, the intermediate position between the right edge and the center position of the panorama image (a quarter position from the right edge of the panorama image) through the user interface 315, the controller 310 determines the imaging direction, based on the position of the moved imaging direction cursor QS on the panorama image. Further, the controller 310 generates a command signal CM for a pan operation to move the imaging direction of the camera unit 201 to the determined imaging direction, that is, to the right by "90°" from the reference direction, and supplies the command signal CM to the camera terminal apparatus 20.

The terminal controller 210 of the camera terminal apparatus 20 that has received the command signal CM generates a direction control signal CTc in accordance with the command signal CM and supplies it to the imaging direction controller 204. The imaging direction controller 204 generates drive signals MDp and MDt in accordance with the direction control signal CTc and supplies them to the imaging direction adjuster 205. Thus, the imaging direction adjuster 205 is driven in accordance with the command signal CM, thereby making it possible to move the imaging direction of the camera unit 201 to the direction indicated by the imaging direction cursor QS. Further, the imaging direction controller 204 generates a camera position information signal PM and supplies it to the camera control apparatus 30.

The position determination processor 303 of the camera control apparatus 30 determines which position in the panorama image corresponds to the imaging direction indicated by the camera position information signal PM and supplies a position determination result KP to the panorama image processor 304. The panorama image processor 304 performs panorama image processing based on the position determination result KP and generates a panorama image signal DPC in which the determined position is the center position.

Figure 4A:
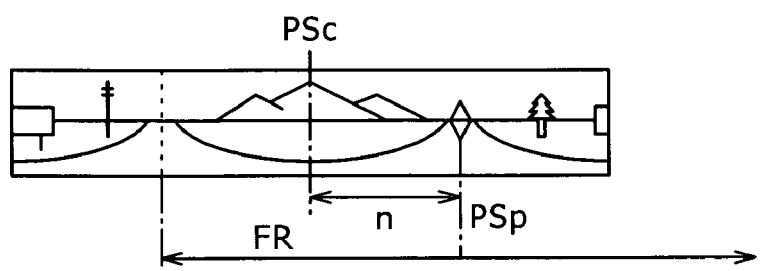
FIGS. 4A to 4C are illustrations of assistance in explaining panorama image processing.

Upon performing a pan operation to move the imaging direction of the camera unit 201 by "90°" to the right from the reference direction, the position determination processor 303 determines based on the camera position information signal PM that the imaging direction is the intermediate position between the right edge and the center position of the panorama image. Accordingly, at the panorama image processor 304, a position PSp moved by "90°" to the right from the reference direction is set as the center position of a panorama image display frame FR, as shown in FIG. 4A.

Figure 4B:
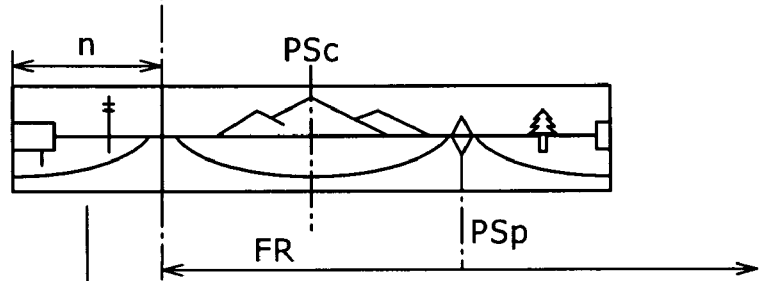
Figure 4C:
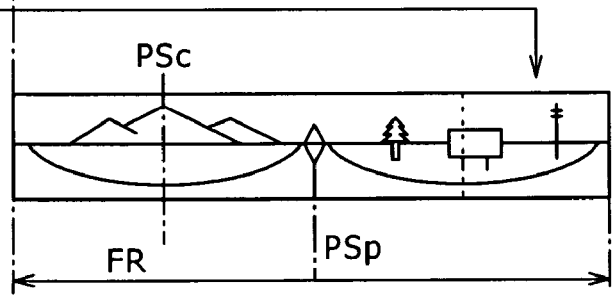

Assume that the difference in the pan direction between the position PSp of the imaging direction and the center position PSc of the panorama image is the number of pixels "n" (which corresponds to 90° in the panorama image). As shown in FIG. 4B, the image of the area outside the panorama image display frame FR, that is, the image of the area for the number of pixels "n" from the left edge of the panorama image is cut off. Further, the cut image is pasted to the area having no image in the panorama image display frame FR, that is, on the right side of the right edge of the panorama image as shown in FIG. 4C, thus generating the panorama image signal DPC of the panorama image in which the determined position PSp is the center position.

Thus, in the case where the determined position is turned to the center position of the panorama image display frame, only pasting the image outside the panorama image display frame to the area having no image in the panorama image display frame makes it possible to generate the panorama image signal DPC of the panorama image in which the determined position, that is, the current imaging direction is the center position, thereby negating the need to perform complicated computation etc. and making it possible to simplify the structure and processing operation of the panorama image processor 304.

Figure 5:
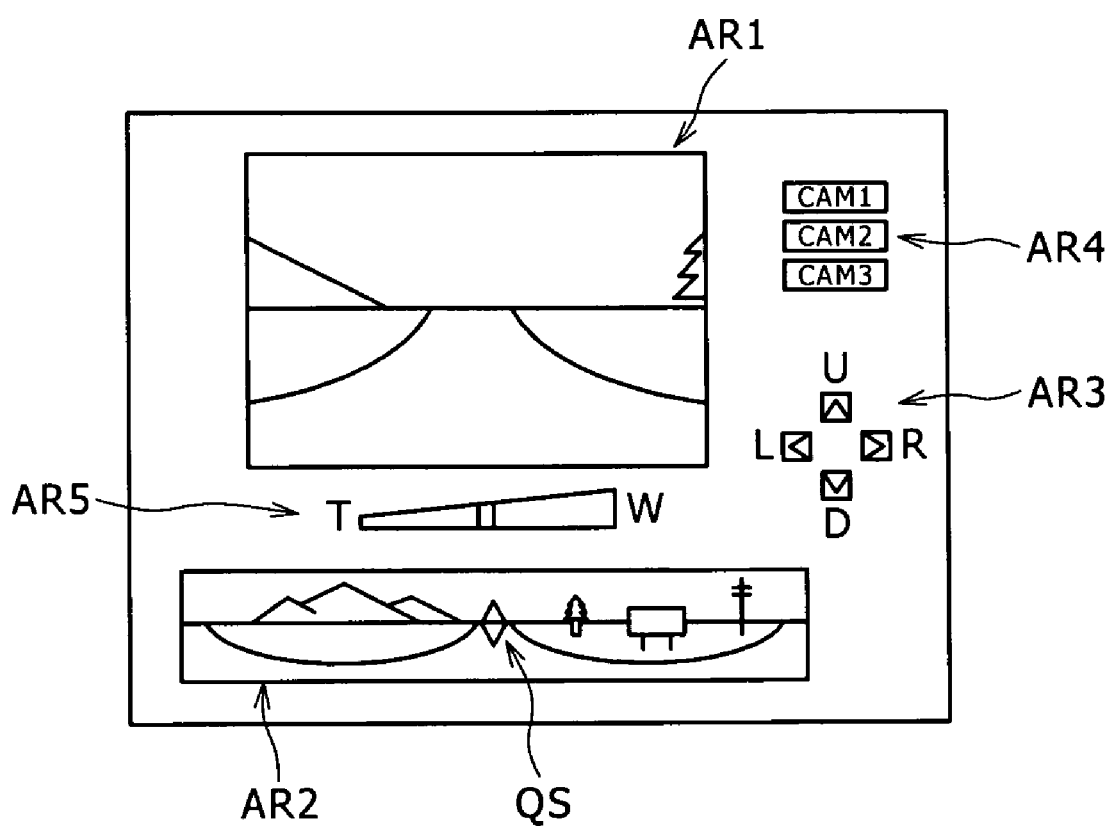
FIG. 5 is an illustration showing a display screen after pan operation.
Figure 7A:
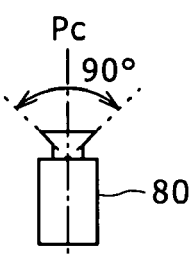
FIGS. 7A to 7D are illustrations of assistance in explaining the relationship between pan operation and a panorama image.
Figure 7B:
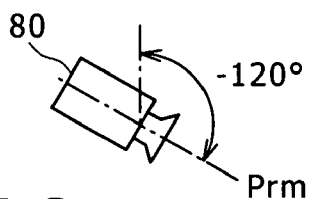
Figure 7C:
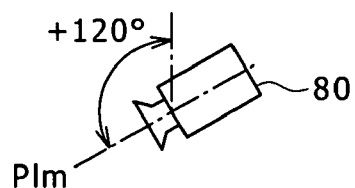
Figure 7D:
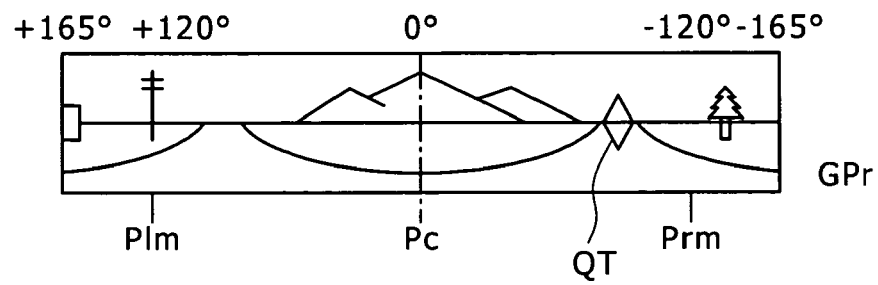
Figure 8:
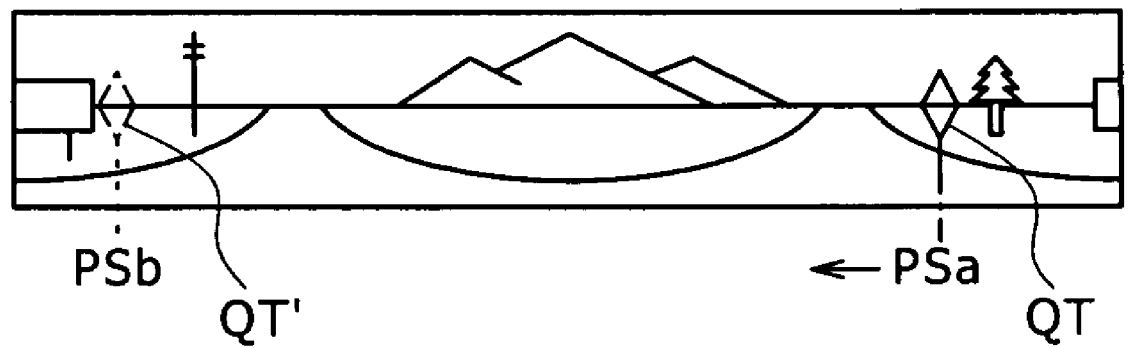
FIG. 8 is an illustration of assistance in explaining imaging direction movement operation in the case of endless pan.

When the panorama image signal DPC is thus generated, the panorama image in which the imaging direction in place of the reference direction is turned to the center position is displayed in the display area AR2 on the screen of the display 306 as shown in FIG. 5. Further, the image shot by the camera unit 201 that has moved the imaging direction is displayed in the display area AR1.

Further, if the imaging direction controller 204 repeatedly generates and supplies a camera position information signal PM to the camera control apparatus 30 during the pan operation of the camera unit 201, it is possible to move the panorama image in the direction opposite to the moving direction of the imaging direction, in accordance with the movement of the imaging direction of the camera unit 201. The imaging direction cursor QS is displayed in the center of the panorama image display frame after outputting the command signal CM for a pan operation to move the imaging direction to the right by "90°" from the reference direction. Further, the imaging direction cursor QS may be displayed at the position of the imaging direction, using the camera position information signal PM. In this case as well, the imaging direction cursor QS is displayed in the center of the panorama image display frame.

It is possible to perform, by software processing, the operation to move a panorama image in accordance with an imaging direction and display it. In this case, a program is beforehand stored in a memory. Alternatively, a program is beforehand recorded on a recording medium, and the recorded program is read into the memory. Alternatively, a program is downloaded into the memory via a network, and the program stored in the memory is read and executed by a CPU (Central Processing Unit).

FIG. 6 shows a flowchart of software processing. In step ST1, the CPU acquires camera position information indicative of the imaging direction of the camera unit. In step ST2, the CPU performs position determination processing, that is, determines which position in the panorama image corresponds to the imaging direction, based on the camera position information. In step ST3, the CPU determines the difference between the determined position and the center position of the panorama image. In step ST4, the CPU performs panorama image processing based on the difference, and generates a panorama image in which the imaging direction is the center position of the image.

If the panorama image in which the imaging direction is turned to the center position of the image is thus generated and the image is displayed based on the panorama image signal DPC of the generated panorama image, it is possible to move the panorama image in accordance with the imaging direction and display it by software processing as well.

In the above embodiment, the description has been made on the pan operation of the imaging direction. However, panorama image processing may be performed based on an imaging direction in a panorama image generated by performing pan and tilt operation.

Further, the above description has been made of the case where the panorama image is generated in such a way that the center position is the reference direction. However, the invention is not limited to the case where the panorama image is generated in such a way that the center position is the reference direction. In the case where the center position of a panorama image is different from a reference direction, the detection of the imaging range of the panorama image makes it possible to determine the angle difference between the center position of the panorama image and the reference direction. Thus, even in the case where the center position of the panorama image is different from the reference direction, it is possible to determine which position in the panorama image corresponds to the imaging direction, based on the determined angle difference and the camera position information signal PM.

As described above, the panorama image is displayed in such a way that the center position of the panorama image is the imaging direction, there by making it possible to rapidly move the imaging direction to a desired direction, using the displayed panorama image. For example, in the case where pan operation can be performed in an endless manner and the imaging direction is moved to a desired direction, it is possible to prevent an inability to rapidly move the imaging direction to the desired direction due to pan operation performed in the reverse direction. Further, since the center position of the panorama image is the imaging direction, it is easy to determine the current imaging direction.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging system comprising a camera terminal apparatus capable of performing pan operation and/or tilt operation and a camera control apparatus for controlling the camera terminal apparatus, wherein,
   the camera terminal apparatus comprises:
   a signal processor configured to generate a panorama image,
   a panorama image storing unit configured to store the generated panorama image; and
   an imaging direction controller configured to generate camera position information indicative of an imaging direction based upon a calculation of a speed and an acceleration for use in moving the image direction of the camera, and
   the camera control apparatus comprises:
   a position determination processor configured to determine a position of the imaging direction in the panorama image, based on the camera position information; and
   a panorama image processor configured to determine a difference between the determined position and a center position of the panorama image, and process the panorama image in such a way that the determined position becomes the center position of the image, based on the difference, wherein
   in the case where the determined position is set to the center position of a panorama image display frame, the panorama image processor extracts an image corresponding to an image area which is outside the panorama image display frame due to the setting of the center position and sets the extracted image to an area having no image in the panorama image display frame due to the setting of the center position.

2. A camera control apparatus comprising:
   a position determination a position determination processor configured to determine a position of the imaging direction in the panorama image, based on the camera position information indicative of an imaging direction based upon a calculation of a speed and an acceleration for use in moving the image direction of the camera; and
   a panorama image processor configured to determine a difference between the determined position and a center position of the panorama image, and process the panorama image in such a way that the determined position becomes the center position of the image, based on the difference, wherein
   in the case where the determined position is set to the center position of a panorama image display frame, the panorama image processor extracts an image corresponding to an image area which is outside the panorama image display frame due to the setting of the center position and sets the extracted image to an area having no image in the panorama image display frame due to the setting of the center position.

3. The camera control apparatus according to claim 2, further comprising:
   a display configured to display the panorama image processed by the panorama image processor;
   a display processor configured to display a cursor indicative of the imaging direction of the camera on the panorama image;
   a user interface; and
   a controller configured to provide an instruction for performing pan operation and/or tilt operation in accordance with movement of the cursor when an operation to move the cursor is performed through the user interface.

4. A panorama image display method performed by an imaging system comprising:
   acquiring camera position information indicative of an imaging direction of a camera based upon a calculation of a speed and an acceleration for use in moving the image direction of the camera;
   determining a position of the imaging direction in a panorama image, based on camera position information;
   determining a difference between the determined position and a center position of the panorama image;
   processing the panorama image in such a way that the determined position becomes the center position of the image, based on the difference;
   in the case where the determined position is set to the center position of a panorama image display frame, extracting an image corresponding to an image area which is outside the panorama image display frame due to the setting of the center position and setting extracted image to an area having no image in the panorama image display frame due to the setting of the center position; and
   displaying the processed panorama image.

5. A non-transitory computer readable storage medium, wherein a program for controlling a computer to execute a method is recorder, the method comprising:
- acquiring camera position information indicative of an imaging direction of a camera based upon a calculation of a speed and an acceleration for use in moving the image direction of the camera;
- determining a position of the imaging direction in a panorama image, based on camera position information;
- determining a difference between the determined position and a center position of the panorama image;
- processing the panorama image in such a way that the determined position becomes the center position of the image, based on the difference; and
- in the case where the determined position is set to the center position of a panorama image display frame, extracting an image corresponding to an image area which is outside the panorama image display frame due to the setting of the center position and setting extracted image to an area having no image in the panorama image display frame due to the setting of the center position.

6. The camera control apparatus according to claim 2, wherein,
the panorama image has a 360° field of view.

7. The camera control apparatus according to claim 6, wherein,
the setting of the extracted image creates a new panorama image centered about the determined center position such that the new panorama image extends seamlessly, in the panorama image display frame, to both +180° and −180° from the determined center position.

8. The camera control apparatus according to claim 7, wherein,
the new panorama image is created by moving the image area which, prior to the moving, is outside the panorama image display frame due to the setting of the center position to an opposing side of the image display frame so that the new panorama image extends seamlessly from +180° and −180°.

* * * * *